United States Patent
Strohmann et al.

(10) Patent No.: US 12,416,996 B2
(45) Date of Patent: Sep. 16, 2025

(54) DEVICES INCLUDING ONE OR MORE HIGH-IMPEDANCE LAYERS BETWEEN A DISPLAY STACK AND AN ULTRASONIC FINGERPRINT SENSOR STACK

(71) Applicant: QUALCOMM Incorporated, San Diego, CA (US)

(72) Inventors: Jessica Liu Strohmann, Cupertino, CA (US); Shiang-Chi Lin, Taoyuan (TW); Shaojui Li, Hsinchu (TW); Hsiang-Chi Liu, Taoyuan (TW); Chia-Wei Yang, Hsinchu (TW); Jae Hyeong Seo, Pleasanton, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/421,350

(22) Filed: Jan. 24, 2024

(65) Prior Publication Data
US 2025/0238104 A1 Jul. 24, 2025

(51) Int. Cl.
G06F 3/043 (2006.01)
G06V 40/12 (2022.01)
G06V 40/13 (2022.01)

(52) U.S. Cl.
CPC .......... *G06F 3/043* (2013.01); *G06V 40/1306* (2022.01); *G06V 40/1365* (2022.01)

(58) Field of Classification Search
CPC . G06V 40/1365; G06V 40/1306; G06F 3/043
See application file for complete search history.

(56) References Cited

U.S. PATENT DOCUMENTS 11,436,857 B1 * 9/2022 Strohmann ............. G06F 21/32
2015/0165479 A1 * 6/2015 Lasiter .................. B06B 1/0666
29/25.35
(Continued)

FOREIGN PATENT DOCUMENTS

WO 2023034657 A1 3/2023

OTHER PUBLICATIONS

International Search Report and Written Opinion—PCT/US2024/058533—ISA/EPO—mar. 17, 2025.

*Primary Examiner* — Matthew A Eason
*Assistant Examiner* — Scott D Au
(74) *Attorney, Agent, or Firm* — QUALCOMM Incorporated

(57) ABSTRACT

An apparatus may include a display stack, an ultrasonic sensor stack and a high-impedance stack including one or more high-impedance layers. The ultrasonic sensor stack may include an ultrasonic transceiver layer and an ultrasonic transceiver circuitry (UTC) layer. Each of the high-impedance layers may have an acoustic impedance that is higher than an acoustic impedance of the UTC layer. The high-impedance stack and the ultrasonic sensor stack may form an acoustic resonator bounded by the UTC layer and the high-impedance stack. The acoustic resonator may be configured to enhance the ultrasonic waves transmitted by the ultrasonic sensor stack at a peak frequency of the ultrasonic sensor stack. The peak frequency may be a frequency used by the ultrasonic sensor stack for obtaining fingerprint images. An apparatus stack portion that includes the ultrasonic sensor stack may have a thickness corresponding to a multiple of a quarter wavelength at the peak frequency.

20 Claims, 11 Drawing Sheets

(56) References Cited

U.S. PATENT DOCUMENTS

| | | | |
|---|---|---|---|
| 2018/0373913 A1* | 12/2018 | Panchawagh | H10K 59/65 |
| 2022/0004728 A1* | 1/2022 | Strohmann | G06V 40/1306 |
| 2022/0198172 A1* | 6/2022 | Strohmann | G06V 40/1306 |
| 2022/0312115 A1* | 9/2022 | Herrera | H04R 1/028 |
| 2023/0063693 A1 | 3/2023 | Lin et al. | |
| 2023/0086418 A1 | 3/2023 | Strohmann et al. | |
| 2023/0088820 A1 | 3/2023 | Strohmann et al. | |

* cited by examiner

DEVICES INCLUDING ONE OR MORE HIGH-IMPEDANCE LAYERS BETWEEN A DISPLAY STACK AND AN ULTRASONIC FINGERPRINT SENSOR STACK

TECHNICAL FIELD

This disclosure relates generally to sensor devices and related methods, including but not limited to devices that include under-display ultrasonic sensors and methods for using such devices.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a display stack, an ultrasonic sensor stack including an ultrasonic transceiver layer and an ultrasonic transceiver circuitry layer and a high-impedance stack including one or more high-impedance layers. In some examples, the high-impedance stack may reside between the ultrasonic sensor stack and the display stack. According to some examples, each of the one or more high-impedance layers may have an acoustic impedance that is higher than an acoustic impedance of the ultrasonic transceiver circuitry layer. In some examples, the high-impedance stack and the ultrasonic sensor stack may form an acoustic resonator bounded by the ultrasonic transceiver circuitry layer and the high-impedance stack. According to some examples, a peak frequency of the acoustic resonator may be a frequency used by the ultrasonic sensor stack for obtaining fingerprint images.

In some examples, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, an apparatus stack portion that includes the ultrasonic sensor stack may have a thickness corresponding to a multiple of a quarter wavelength at the peak frequency. In some examples, each of the one or more high-impedance layers may have an acoustic impedance that is in a range from 20 megarayls (MRayls) to 50 MRayls. According to some examples, the peak frequency of the acoustic resonator may be in a range from 8 megahertz (MHz) to 15 MHz.

In some examples, the ultrasonic transceiver layer may be adjacent to the ultrasonic transceiver circuitry layer. According to some examples, the high-impedance stack may be, or may include, a single high-impedance layer. In some examples, the single high-impedance layer may be a conductive layer. According to some examples, the single high-impedance layer may reside proximate the ultrasonic transceiver layer, further comprising a bonding layer residing between the single high-impedance layer and the ultrasonic transceiver layer and wherein the bonding layer comprises a light-curable adhesive layer, a thin light-curable resin-based epoxy or a pressure sensitive adhesive (PSA). In some examples, the bonding layer may be, or may include, a PSA layer less than 3 microns in thickness.

Other innovative aspects of the subject matter described in this disclosure may be implemented in a method. Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
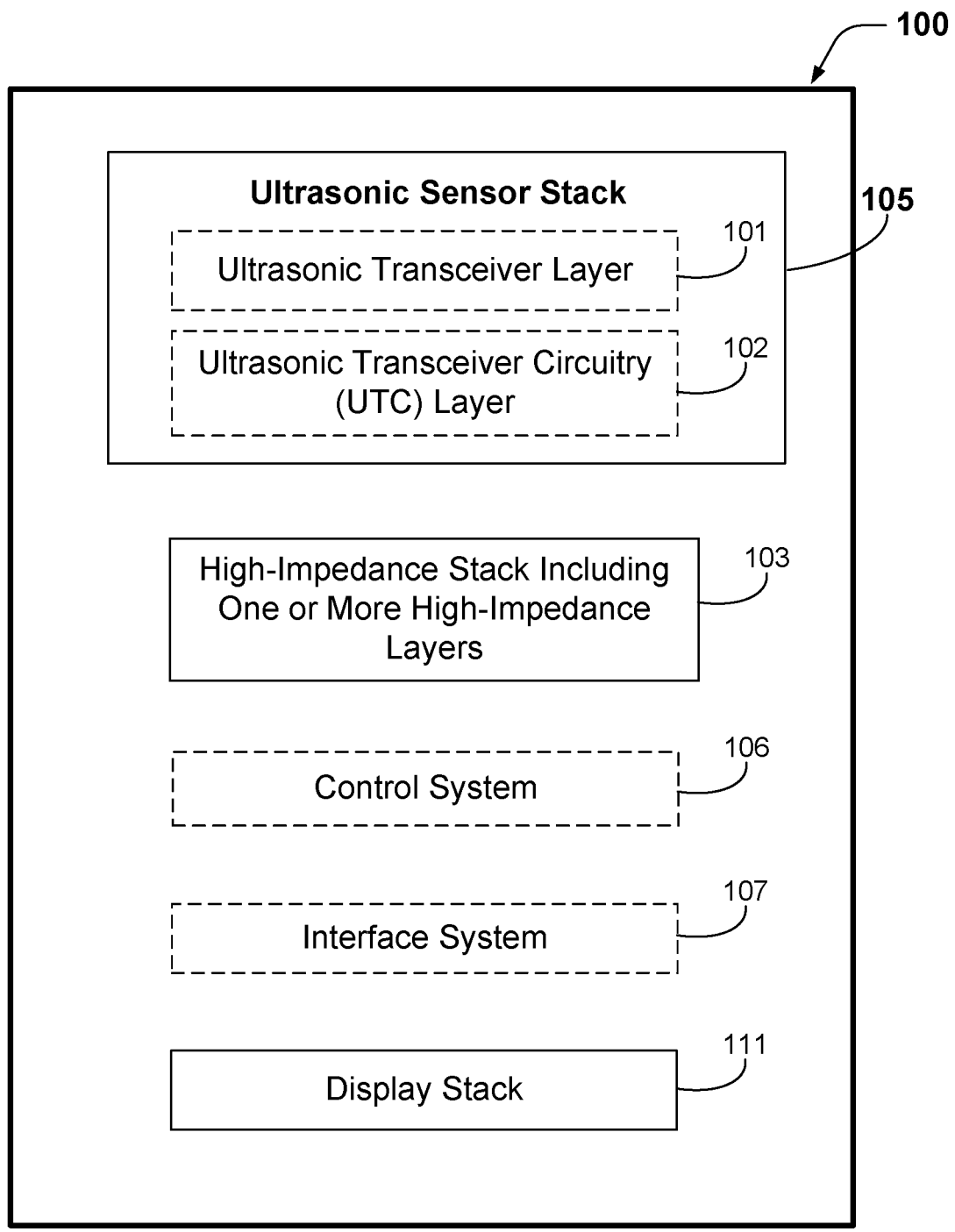
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

It is challenging to design an under-display ultrasonic sensor system that provides acceptable performance. Nonetheless, the present assignee has successfully designed under-display ultrasonic sensor systems that are widely deployed in cell phones and other display devices. These under-display ultrasonic sensor systems performed well when used with previously-deployed display devices. However, as the display stacks of these display devices are updated, some of the expected changes could result in a degradation of ultrasonic sensor system performance.

Some disclosed devices include a display stack, an ultrasonic sensor stack and a high-impedance stack residing between the ultrasonic sensor stack and the display stack. The ultrasonic sensor stack may include an ultrasonic transceiver layer—such as a piezoelectric layer—and an ultrasonic transceiver circuitry (UTC) layer—such as a thin-film transistor (TFT) layer. The high-impedance stack may include one or more high-impedance layers having an acoustic impedance that is higher than an acoustic impedance of the UTC layer. In some examples, the high-impedance stack and the ultrasonic sensor stack may form an acoustic resonator bounded by the UTC layer and the high-impedance stack. According to some examples, a portion of the apparatus stack that includes the UTC layer may have a thickness corresponding to a multiple of a quarter wavelength at a peak frequency of the ultrasonic sensor stack. The peak frequency may be a frequency used by the ultrasonic sensor stack for obtaining fingerprint images.

Particular implementations of the subject matter described in this disclosure may be implemented to realize one or more of the following potential advantages. Some disclosed display devices have enhanced transmission of ultrasonic waves in an ultrasonic frequency range that is suitable for ultrasonic fingerprint sensors, as compared to the transmission of ultrasonic waves of display devices that lack some version of the disclosed acoustic resonator bounded by the UTC layer and the high-impedance stack. Implementations wherein the high-impedance stack resides between an ultrasonic sensor stack and a display may be manufactured without modifying the display stack, thereby avoiding additional manufacturing cost and time. The high-Q resonance caused by the high-impedance stack residing between an ultrasonic sensor stack and a display can dramatically boost the acoustic signal intensity, in some cases by more than 100%.

FIG. 1 is a block diagram that shows example components of an apparatus according to some disclosed implementations. As with other disclosed implementations, the numbers, types and arrangements of elements shown in FIG. 1 are merely presented by way of example. Although not shown in FIG. 1, the apparatus 100 may include other components, such as a cover (which may be, or may include, a cover glass), one or more adhesive layers, one or more electrode layers, etc. Some examples are described below. In some implementations, the apparatus 100 may be a mobile device that includes the elements shown in FIG. 1.

According to this example, the apparatus 100 includes an ultrasonic sensor stack 105. In some examples, the ultrasonic sensor stack 105 includes an ultrasonic transceiver layer 101 and an ultrasonic transceiver circuitry (UTC) layer 102. In some such examples, the ultrasonic transceiver layer 101 may be configured to function as both an ultrasonic transmitter and an ultrasonic receiver. According to some implementations, the ultrasonic transceiver layer 101 may be a single piezoelectric layer, whereas in other implementations the ultrasonic transceiver layer 101 may be a multi-layer piezoelectric structure, or an array of such structures.

For example, in some implementations, the ultrasonic transceiver layer 101 may include a piezoelectric layer, such as a layer of PVDF polymer or a layer of PVDF-TrFE copolymer. In some implementations, other piezoelectric materials may be used in the ultrasonic transceiver layer 101, such as aluminum nitride (AlN) or lead zirconate titanate (PZT). Some alternative implementations may include separate ultrasonic transmitter and ultrasonic receiver layers.

The ultrasonic transceiver layer 101 may, in some alternative examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

The UTC layer 102 may, in some examples, be a type of metal-oxide-semiconductor field-effect transistor (MOSFET) made by depositing thin films of an active semiconductor layer as well as a dielectric layer and metallic contacts over a UTC substrate. In some examples, the UTC substrate may be, or may include, a non-conductive material such as glass. In some such examples, the UTC layer 102 may be, or may include, a thin-film transistor (TFT) layer. However, in other examples, the layer 102 may include, one or more silicon layers, one or more polyethylene terephthalate layers, one or more polyimide layers, or combinations thereof. According to some implementations, the UTC layer may have a thickness that is in the range of 40 microns to 200 microns, for example 40 microns, 45 microns, 50 microns, 55 microns, 60 microns, 65 microns, 70 microns, 75 microns, 80 microns, 85 microns, 90 microns, 95 microns, 100 microns, 105 microns, 110 microns, 115 microns, 120 microns, 125 microns, 130 microns, 135 microns, 140 microns, 145 microns, 150 microns, 155 microns, 160 microns, 165 microns, 170 microns, 175 microns, 180 microns, 185 microns, 190 microns, 195 microns, 200 microns, etc.

In this implementation, the apparatus includes a display stack 111. In some examples, the display stack 111 may be a non-foldable display stack that includes one or more glass layers. In other examples, the display stack 111 may be a foldable display stack that includes a display stiffener. The display stack 111 may, in some examples, include layers of a light-emitting diode (LED) display, such as an organic light-emitting diode (OLED) display. According to some examples, the display stack layers may form one or more display stack resonators. The display stack resonator(s) may, in some examples, be configured to enhance ultrasonic waves transmitted by the ultrasonic sensor stack 105. In some such examples, the peak frequency of the ultrasonic sensor stack 105 may be tuned—for example, according to the thickness of the UTC layer 102 and/or other layers—to match a peak frequency of a display stack resonator.

According to this example, the apparatus 100 includes a high-impedance stack 103 that includes one or more high-impedance layers. In some examples, the high-impedance stack 103 may be, or may include, an aluminum oxide ($Al_2O_3$) layer having a thickness in a range from 20 microns to 60 microns, a copper layer having a thickness in a range from 10 microns to 40 microns, a nickel/copper alloy layer having a thickness in a range from 10 microns to 40 microns or a stainless steel layer having a thickness in the range from 10 microns to 60 microns. According to some examples, the high-impedance stack 103 may reside between the ultrasonic sensor stack 105 and the display stack 111. If the display stack 111 is a foldable display stack, in some examples the high-impedance stack 103 may reside between the ultrasonic sensor stack 105 and a display stiffener of the display stack 111. According to some examples, the high-impedance stack 103 and the ultrasonic sensor stack 105 (e.g., the UTC substrate of the UTC layer 102) may be components of an acoustic resonator that is configured to enhance the ultrasonic waves transmitted by the ultrasonic sensor stack 105 in an ultrasonic frequency range that is suitable for ultrasonic fingerprint sensors. Some examples are described below.

In some examples, the apparatus 100 may include a control system 106. The control system 106 (when present) may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be capable of receiving and processing data from the ultrasonic transceiver layer 101 and/or from an array of sensor pixels, e.g., as described below. In some implementations, functionality of the control system 106 may be partitioned between one or more controllers or processors, such as a dedicated sensor controller and an applications processor of a mobile device.

Some implementations of the apparatus 100 may include an interface system 107. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 107 may be configured to provide communication (which may include wired or wireless communication, such as electrical communication, radio communication, etc.) between components of the apparatus 100. In some such examples, the interface system 107 may be configured to provide communication between the control system 106 and the ultrasonic transceiver layer 101, to provide communication between the control system 106 and one or more layers of the display stack 111, etc. According to some such examples, a portion of the interface system 107 may couple at least a portion of the control system 106 to the ultrasonic receiver layer 101 and/or to an array of sensor pixels, e.g., via electrically conducting material.

According to some examples, the interface system 107 may be configured to provide communication between the apparatus 100 and other devices and/or human beings. In some such examples, the interface system 107 may include one or more user interfaces. The interface system 107 may, in some examples, include one or more network interfaces and/or one or more external device interfaces (such as one or more universal serial bus (USB) interfaces). In some implementations, the apparatus 100 may include a memory system. The interface system 107 may, in some examples, include at least one interface between the control system 106 and a memory system.

The apparatus 100 may be used in a variety of different contexts, many examples of which are disclosed herein. For example, in some implementations a mobile device, such as a cell phone, a smart phone, a tablet, a laptop (e.g., a laptop touchpad), etc., may include at least a portion of the apparatus 100. In some implementations, a wearable device may include at least a portion of the apparatus 100. The wearable device may, for example, be a watch, a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer) and/or a server. The interface system 107 also may, in some such examples, reside in more than one device.

Figure 2A:
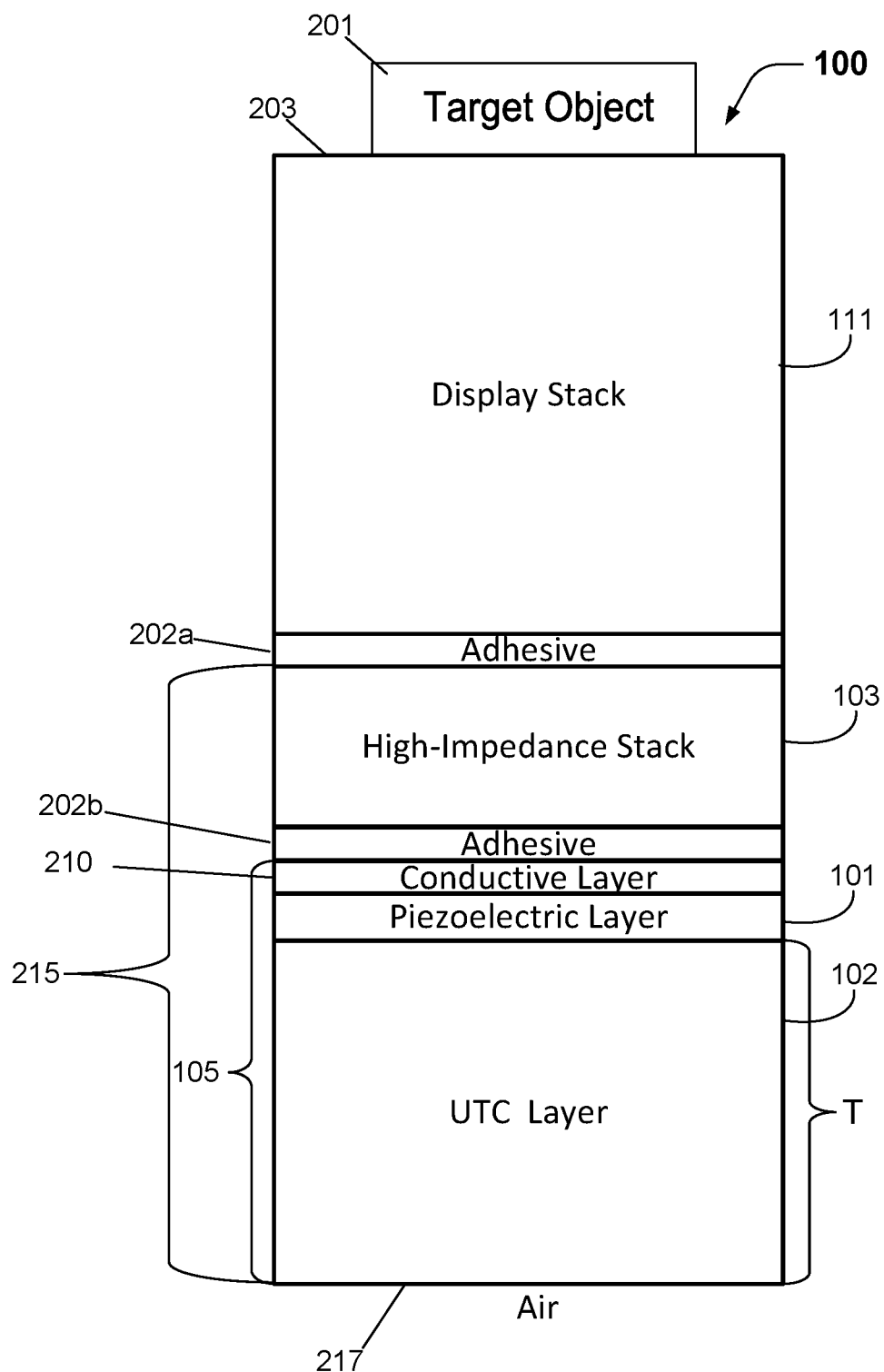
FIG. 2A is a cross-section that shows examples of layers that the apparatus of FIG. 1 may include.

FIG. 2A is a cross-section that shows examples of layers that the apparatus of FIG. 1 may include. The types, number and arrangement of elements shown in FIG. 2A are merely examples. Other examples may include different types, numbers and/or arrangements of elements. Moreover, the elements shown in FIG. 2A are not drawn to scale.

The apparatus 100 of FIG. 2A includes instances of the high-impedance stack 103, the ultrasonic sensor stack 105 and the display stack 111 of FIG. 1. In this example, a target object 201 is shown touching an outer surface 203 of the apparatus 100. Here, the adhesive layer 202a connects the high-impedance stack 103 to the display stack 111 and the ultrasonic sensor stack 105 is attached to the high-impedance stack 103 via an adhesive layer 202b. In some examples, the adhesive layers 202a and 202b may be, or may include, a thin pressure-sensitive adhesive (PSA). Other examples of the adhesive layers 202a and 202b are disclosed herein. In some instances, the adhesive layer 202a may be in the range of 2 microns to 7 microns and the adhesive layer 202b may be in the range of 1 micron to 3 microns.

In the example shown in FIG. 2A, the ultrasonic sensor stack 105 includes a UTC layer 102, an ultrasonic transceiver layer 101 and an conductive layer 210. According to this example, the ultrasonic transceiver layer 101 resides between the UTC layer 102 and the display stack 111. According to this example, the ultrasonic transceiver layer 101 is a piezoelectric layer that may be, or may include, one or more piezoelectric materials, such as a piezoelectric polymer and/or a piezoelectric copolymer. The conductive layer 210 may be, or may include, a conductive ink (e.g., silver ink), a conductive paste, etc.

According to this example, the high-impedance stack 103 resides between the ultrasonic sensor stack 105 and the display stack 111. In this example, the high-impedance stack 103 includes one or more high-impedance layers. In some examples, each of the one or more high-impedance layers has an acoustic impedance that is higher than an acoustic impedance of the UTC layer 102. According to some examples, the high-impedance stack 103 may include at least one high-impedance layer having an acoustic impedance that is higher than an acoustic impedance of any layer in the display stack 111 or the ultrasonic sensor stack 105. In some examples, the high-impedance stack 103 may include at least one high-impedance layer having an acoustic impedance in a range from 20 megarayls (MRayls) to 50 MRayls.

In this example, the high-impedance stack 103 and the ultrasonic sensor stack 105 are components of an acoustic resonator 215 that is bounded by the UTC layer 102 and the high-impedance stack 102. According to this example, the acoustic resonator 215 also includes the adhesive layer 202b. In other examples, the acoustic resonator 215 may not include the adhesive layer 202b or a component that is comparable to the adhesive layer 202b. The present inventors have determined that for some implementations of the acoustic resonator 215, such as the general type shown in FIG. 2A that includes the adhesive layer 202b, it can be beneficial for the adhesive layer 202b to be very thin, for example 3 microns or less.

According to some examples, a peak frequency of the acoustic resonator 215 may be a frequency used by the ultrasonic sensor stack for obtaining fingerprint images. The peak frequency may, for example, be in a range from 3 megahertz (MHz) to 20 MHz.

In this instance, surface 217 of the UTC layer 102 is bounded by air. The boundary provided by the air/UTC layer 102 interface can provide a high impedance contrast that may provide a relatively higher quality factor—also known as a "Q factor"—as compared to implementations that may have, for example, a plastic backer layer adjacent to the surface 217 of the UTC layer 102.

Figure 2B:
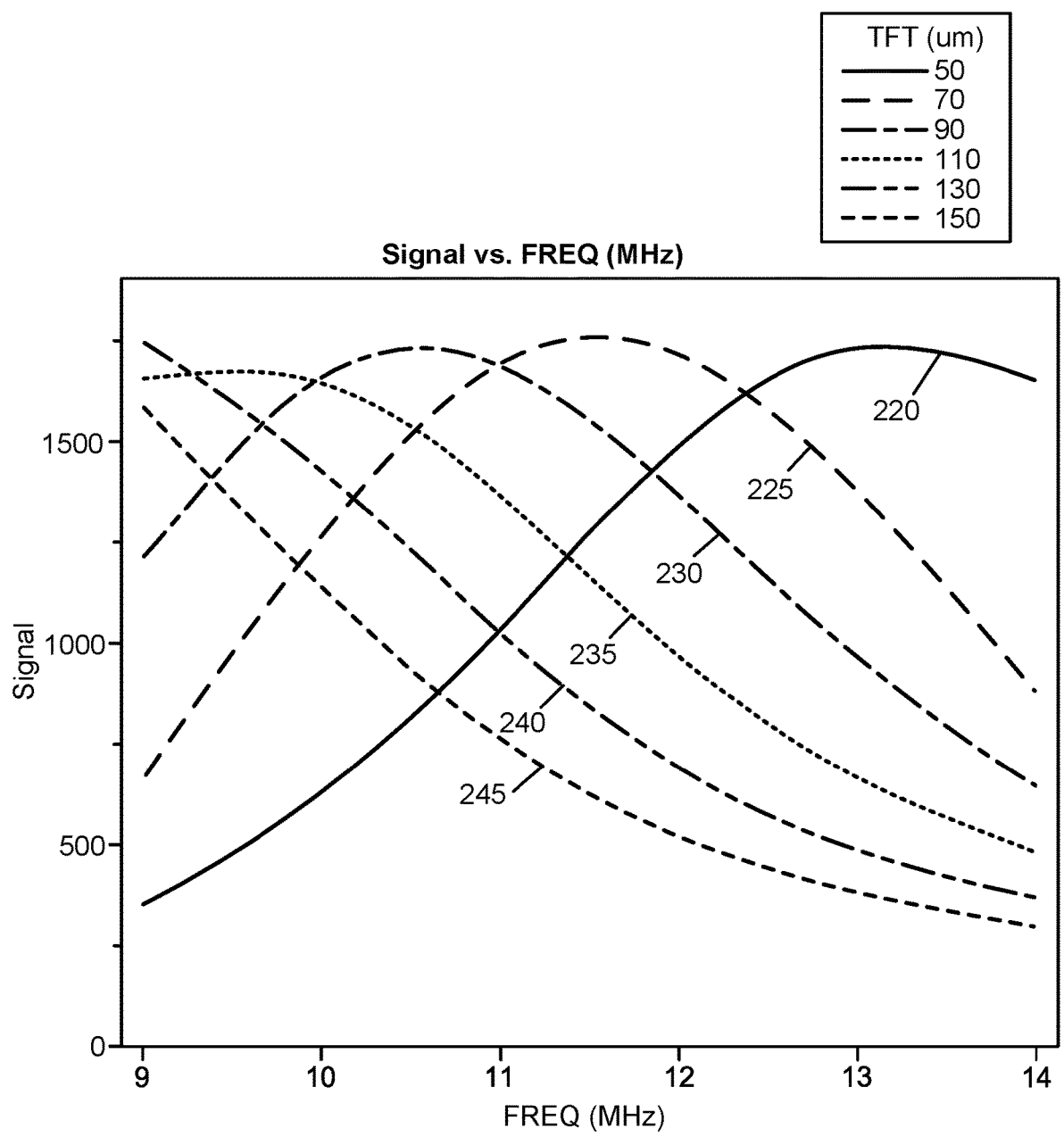
FIG. 2B is a graph that includes curves showing how a peak frequency of the acoustic resonator of implementations like that of FIG. 2A can be modulated by changing a thickness of the ultrasonic transceiver circuitry (UTC) layer.

FIG. 2B is a graph that includes curves showing how a peak frequency of the acoustic resonator of implementations like that of FIG. 2A can be modulated by changing a thickness of the ultrasonic transceiver circuitry (UTC) layer. In this example, the graphed results are based on implementations of the apparatus 100 shown in FIG. 2A in which the high-impedance stack 103 is a single copper layer having a thickness of 25 microns, the ultrasonic transceiver layer 101 is a piezoelectric copolymer having a thickness of 9 microns, the conductive layer 210 is a layer of silver ink having a thickness of 9 microns, the adhesive layer 202b is a pressure-sensitive adhesive (PSA) layer having a thickness of 2 microns and the UTC layer 102 is a TFT layer.

Here, the TFT layer has a variable thickness—in other words, the thickness T shown in FIG. 2A is variable—and each curve shown in FIG. 2B corresponds to one of the TFT thicknesses T: curve 220 corresponds to a TFT layer thickness of 50 microns, curve 225 corresponds to a TFT layer thickness of 70 microns, curve 230 corresponds to a TFT layer thickness of 90 microns, curve 235 corresponds to a TFT layer thickness of 110 microns, curve 240 corresponds to a TFT layer thickness of 130 microns and curve 245 corresponds to a TFT layer thickness of 150 microns. One may observe that by increasing the TFT layer thickness from 50 microns to 110 microns, the peak frequency of the acoustic resonator 215 is reduced from more than 13 MHz to less than 10 MHz. By increasing the TFT layer thickness from 110 microns to 130 microns or 150 microns, the peak frequency of the acoustic resonator 215 is reduced to less than 9 MHz.

Figure 3:
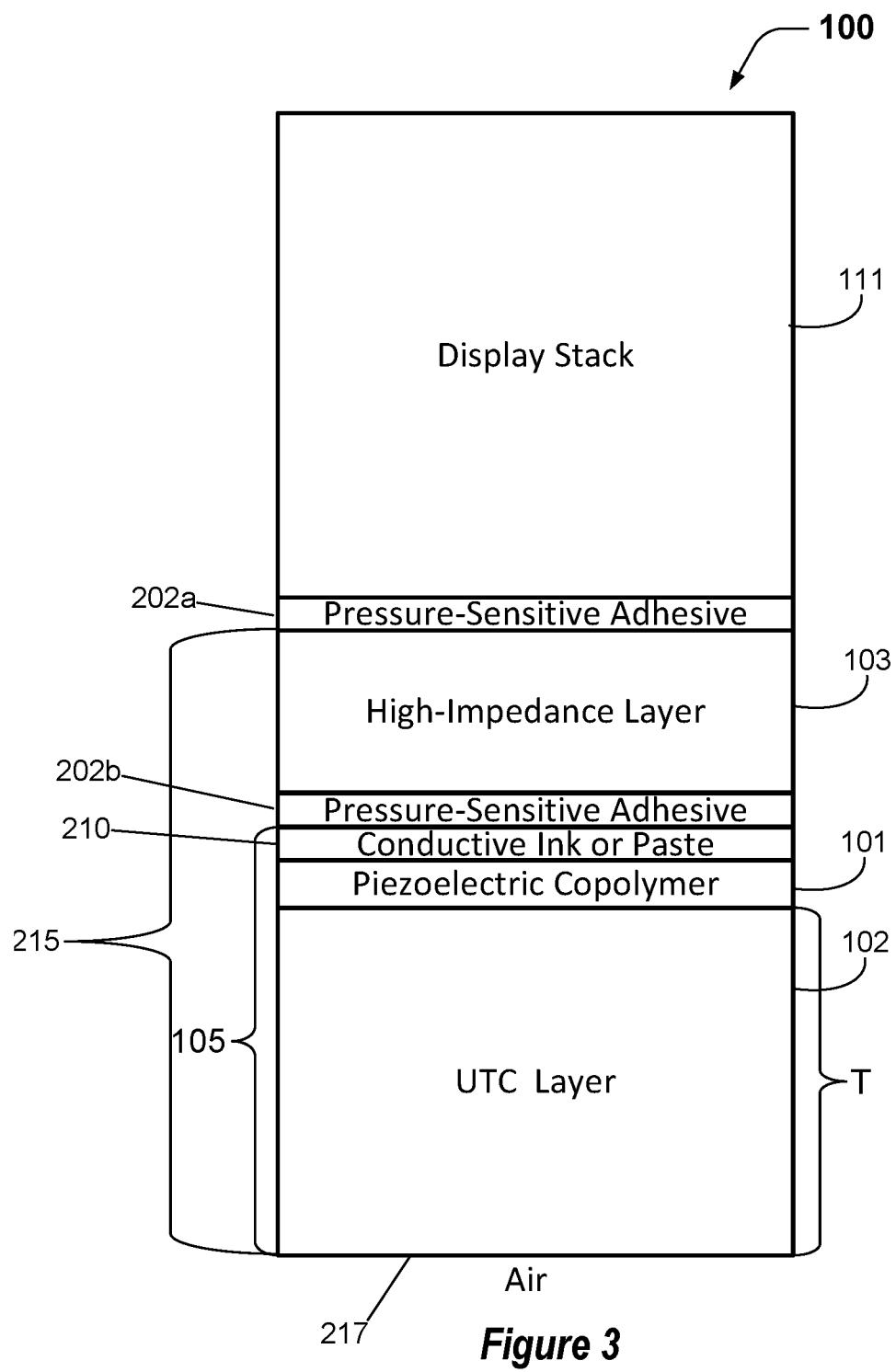
FIG. 3 is a cross-section that shows additional examples of layers that the apparatus of FIG. 1 may include.

FIG. 3 is a cross-section that shows additional examples of layers that the apparatus of FIG. 1 may include. The types, number and arrangement of elements shown in FIG. 3 are merely examples. Other examples may include different types, numbers and/or arrangements of elements. Moreover, the elements shown in FIG. 3 are not drawn to scale.

The apparatus 100 of FIG. 3 is similar to that of FIG. 2A. However, in this particular example the high-impedance stack 103 is a single high-impedance layer. In some such examples, the high-impedance layer 103 may be an aluminum oxide ($Al_2O_3$) layer having a thickness in a range from 20 microns to 60 microns, a copper layer having a thickness in a range from 10 microns to 40 microns, a nickel/copper alloy layer having a thickness in a range from 10 microns to 40 microns or a stainless steel layer having a thickness in the range from 10 microns to 60 microns. In some alternative examples, the high-impedance layer 103 may be a silicon carbide layer, a sapphire layer, or another high-impedance layer. In some examples, the high-impedance layer 103 may have an acoustic impedance that is in a range from 20 MRayls to 50 MRayls.

According to this example, the adhesive layer 202a is a pressure-sensitive adhesive (PSA) that connects the high-impedance layer 103 to the display stack 111 and the adhesive layer 202b is a PSA connects the ultrasonic sensor stack 105 to the high-impedance layer 103. The adhesive layers 202a and 202b may be, or may include, a thin pressure-sensitive adhesive (PSA). In some instances, the adhesive layer 202a may be in the range of 2 microns to 7 microns and the adhesive layer 202b may be in the range of 1 micron to 3 microns.

In the example shown in FIG. 3, the ultrasonic transceiver layer 101 is a piezoelectric copolymer layer. The conductive layer 210 may be a conductive ink or a conductive paste, depending on the particular implementation. In some examples, the UTC layer 102 may be a TFT layer having a thickness in the range of 30 microns to 130 microns. In some examples, the piezoelectric copolymer layer may have a thickness in the range of 5 microns to 15 microns and the conductive layer 210 may have a thickness in the range of 1 micron to 5 microns.

In this example, the high-impedance stack 103 and the ultrasonic sensor stack 105 are components of an acoustic resonator 215 that is bounded by the UTC layer 102 and the high-impedance layer 103. According to this example, the acoustic resonator 215 also includes the adhesive layer 202b. In this instance, surface 217 of the UTC layer 102 is bounded by air. In some examples, a peak frequency of the acoustic resonator 215 may be tuned according to the thickness of the UTC layer 102. According to some examples, the peak frequency of the acoustic resonator 215 may be a frequency used by the ultrasonic sensor stack for obtaining fingerprint images. The peak frequency may, for example, be in a range from 3 MHz to 20 MHz. In some examples, an apparatus stack portion that includes the ultrasonic sensor stack 105 may have a thickness corresponding to a multiple of a quarter wavelength at the peak frequency of the acoustic resonator 215. In this example, the apparatus stack portion also includes the adhesive layer 202b.

Figure 4:
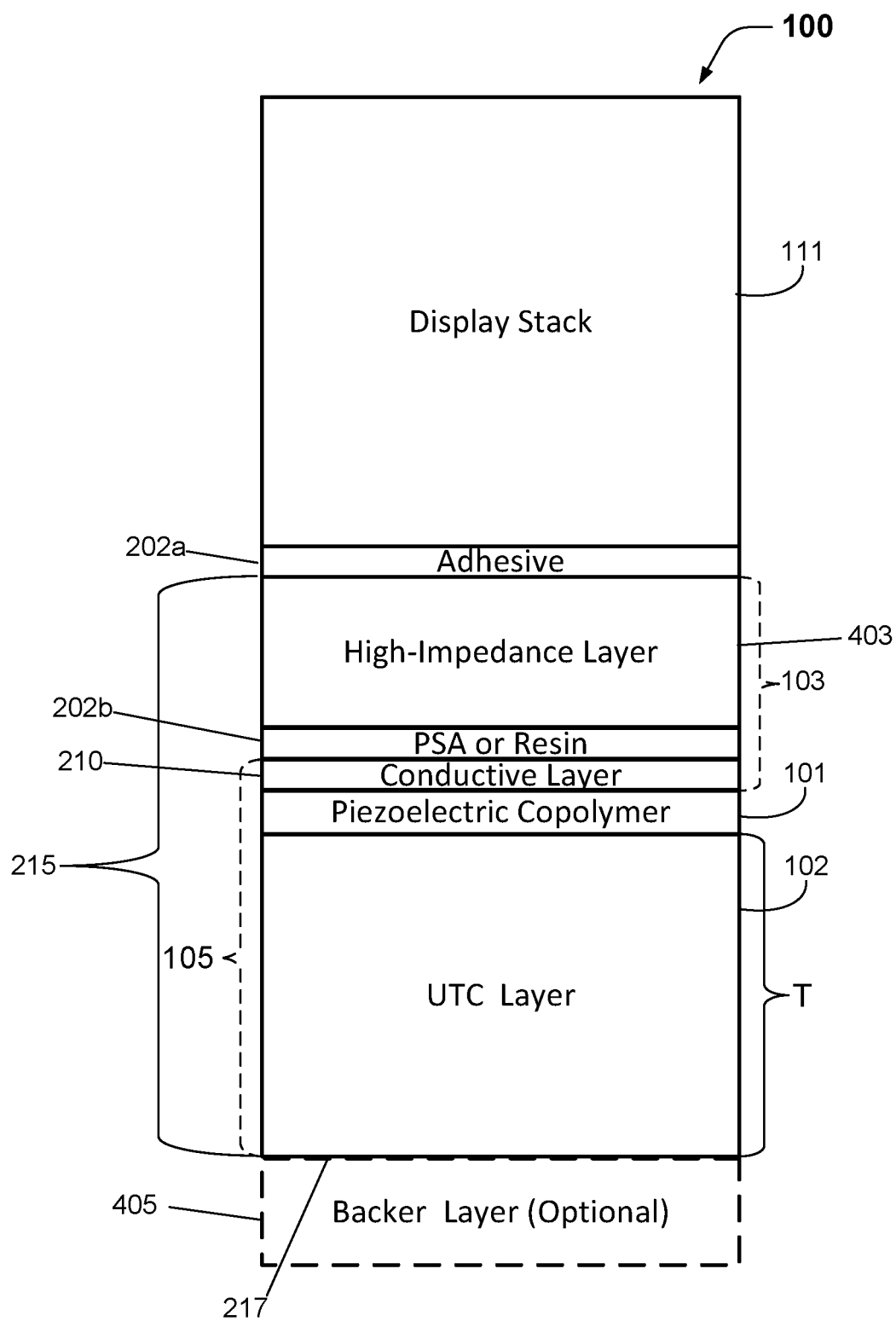
FIG. 4 is a cross-section that shows additional examples of layers that the apparatus of FIG. 1 may include.

FIG. 4 is a cross-section that shows additional examples of layers that the apparatus of FIG. 1 may include. The types, number and arrangement of elements shown in FIG. 4 are merely examples. Other examples may include different types, numbers and/or arrangements of elements. Moreover, the elements shown in FIG. 4 are not drawn to scale.

The apparatus 100 of FIG. 4 is similar to that of FIG. 3. However, in this particular example the surface 217 of the UTC layer 102 is not bounded by air, as shown in FIG. 3, but instead the surface 217 is adjacent to an optional backer layer 405. In some examples, the backer layer 405 may be, or may include, a dye-attached film (DAF) layer. The backer layer 405, when present, may help to protect the UTC layer 102 from corrosion.

The adhesive layers 202a and 202b may vary according to the particular implementation. In some examples, the adhesive layer 202a may be, or may include, a PSA, a resin, double-sided tape (DST) —such as PET DST or copper DST—etc. According to some examples, the adhesive layer 202b may be, or may include, a PSA or a resin. The present inventors have found that it can be advantageous for the adhesive layer 202b to be thinner than the adhesive layer 202ba. In some examples, the adhesive layer 202a may be in the range of 3 microns to 6 microns and the adhesive layer 202b may be in the range of 1 micron to 3 microns, preferably less than 3 microns in some instances.

As indicated by the dashed brackets corresponding to element numbers 105 and 103 in FIG. 4, the conductive layer 210 may, in this example, be considered to be part of the high-impedance stack 103 or the ultrasonic sensor stack 105. In addition to providing electrical connectivity to one side of the piezoelectric copolymer, the conductive layer 210 may also function as part of the upper boundary of the acoustic resonator 215. Having a very thin adhesive layer 202b, preferably less than 3 microns in thickness, can help the conductive layer 210 to function as part of the high-impedance stack 103, which forms the upper boundary of the acoustic resonator 215. In such examples, the high-impedance stack 103 includes a first high-impedance layer residing adjacent to the ultrasonic transceiver layer—the first high-impedance layer being the conductive layer 210— and a second high-impedance layer residing between the first high-impedance layer and the display stack. In this example, the second high-impedance layer is the high-impedance layer 403. In some such examples, it is not necessary for the high-impedance layer 403 to be conductive, but only to have a high acoustic impedance—such as an acoustic impedance that is in a range from 20 MRayls to 50 MRayls.

Figure 5:
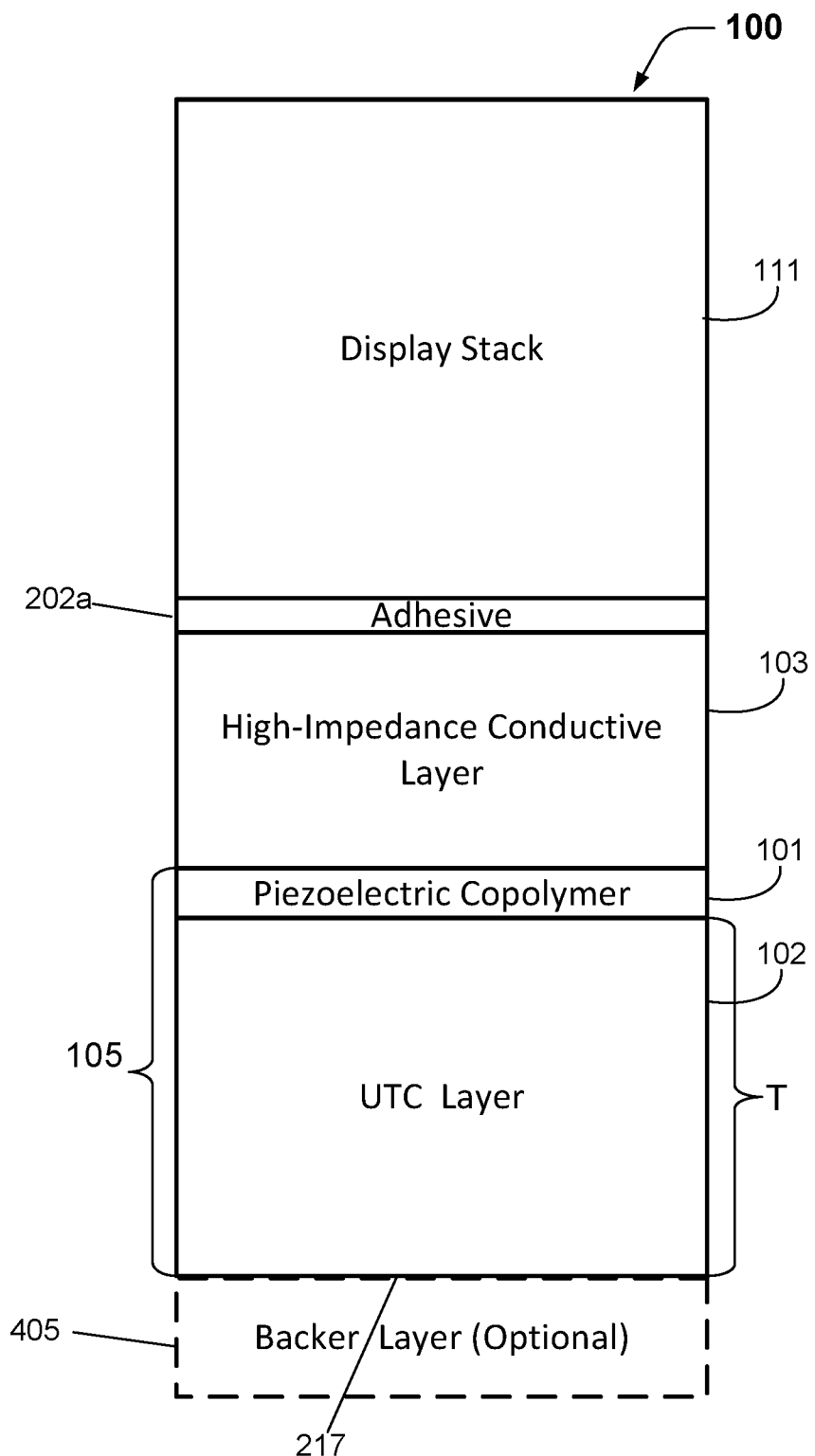
FIG. 5 is a cross-section that shows additional examples of layers that the apparatus of FIG. 1 may include.

FIG. 5 is a cross-section that shows additional examples of layers that the apparatus of FIG. 1 may include. The types, number and arrangement of elements shown in FIG. 5 are merely examples. Other examples may include different types, numbers and/or arrangements of elements. Moreover, the elements shown in FIG. 5 are not drawn to scale.

In the example shown in FIG. 5, the high-impedance stack 103 is a single high-impedance conductive layer that resides adjacent to the ultrasonic transceiver layer 101, which is a piezoelectric copolymer layer in this example. Accordingly, in this example the high-impedance stack 103 provides electrical connectivity to one side of the ultrasonic transceiver layer 101. However, in some alternative implementations of the apparatus 100 of FIG. 5, there may be a thin conductive layer 210—such as a conductive ink layer or a conductive paste layer—between the ultrasonic transceiver layer 101 and the high-impedance conductive layer 103.

According to some examples, the high-impedance conductive layer 103 may be formed on the ultrasonic transceiver layer 101. In some such examples, the high-impedance conductive layer 103 may be formed on the ultrasonic transceiver layer 101 via an electroplating process, an atomic layer deposition (ALD) process, via a sputtering process, via a spin coating process, or via another suitable deposition process. Accordingly, there is no need for the adhesive layer 202b in this example.

Figure 6:
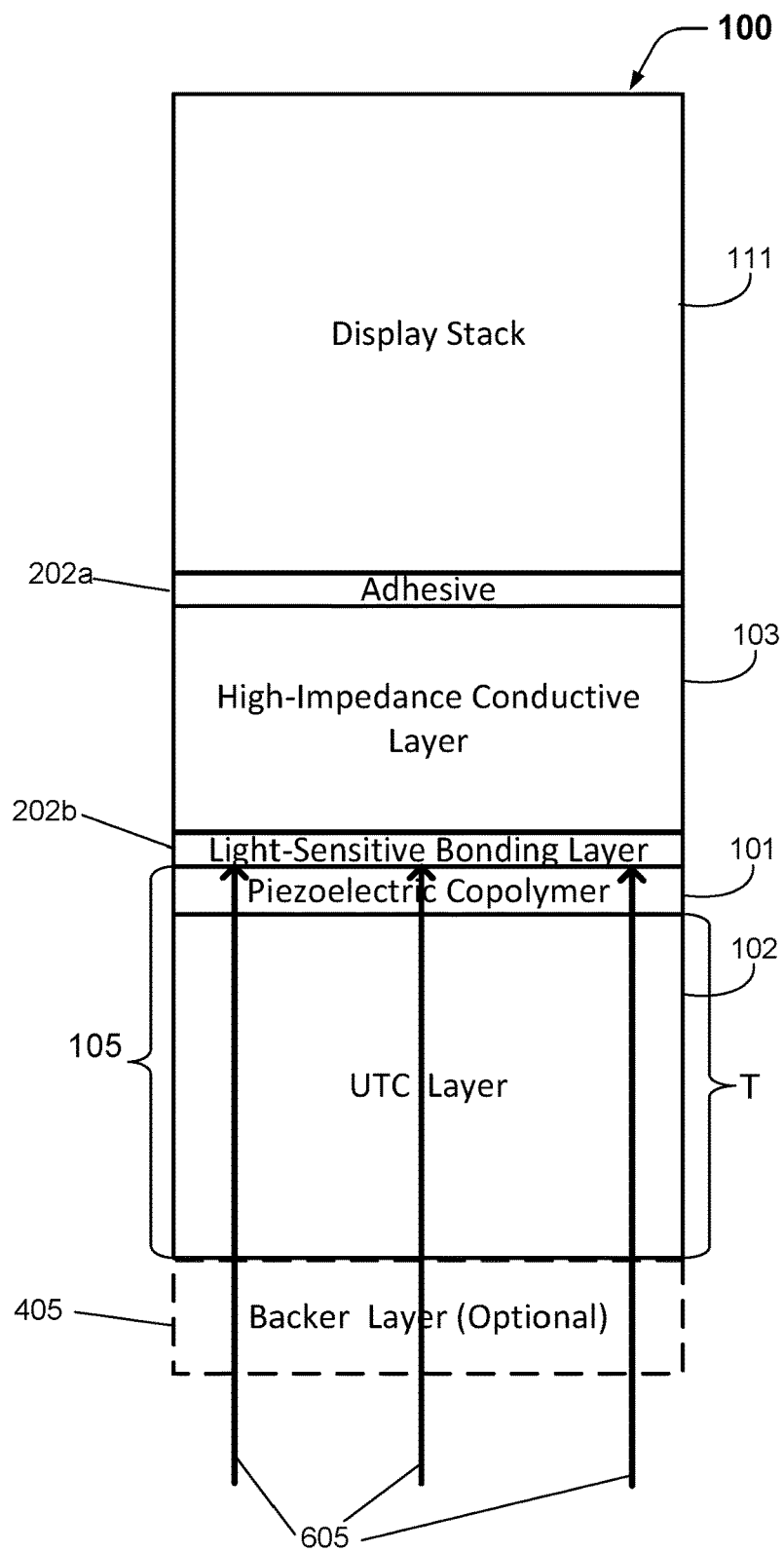
FIG. 6 is a cross-section that shows additional examples of layers that the apparatus of FIG. 1 may include.

FIG. 6 is a cross-section that shows additional examples of layers that the apparatus of FIG. 1 may include. The types, number and arrangement of elements shown in FIG. 6 are merely examples. Other examples may include different types, numbers and/or arrangements of elements. Moreover, the elements shown in FIG. 6 are not drawn to scale.

In the example shown in FIG. 6, the high-impedance stack 103 is a single high-impedance conductive layer that resides adjacent to the ultrasonic transceiver layer 101, which is a piezoelectric copolymer layer in this example. Accordingly, in this example the high-impedance stack 103 provides electrical connectivity to one side of the ultrasonic transceiver layer 101.

According to this example, the high-impedance conductive layer 103 is attached to the ultrasonic transceiver layer 101 via the adhesive layer 202b, which is a light-sensitive bonding layer in this example. In some such examples, the adhesive layer 202b may be, or may include, a light-curable adhesive layer, a light-curable resin-based epoxy, etc. In some examples, the adhesive layer 202b may have a thickness in the range of 1 micron to 3 microns, for example 2 microns.

In this example, the optional backer layer 405, the UTC layer 102 and the ultrasonic transceiver layer 101 are transparent, or substantially transparent, allowing curing light 605 to penetrate through the optional backer layer 405, the UTC layer 102 and the ultrasonic transceiver layer 101 and to cure the light-sensitive bonding layer during fabrication of the apparatus 100.

Figure 7:
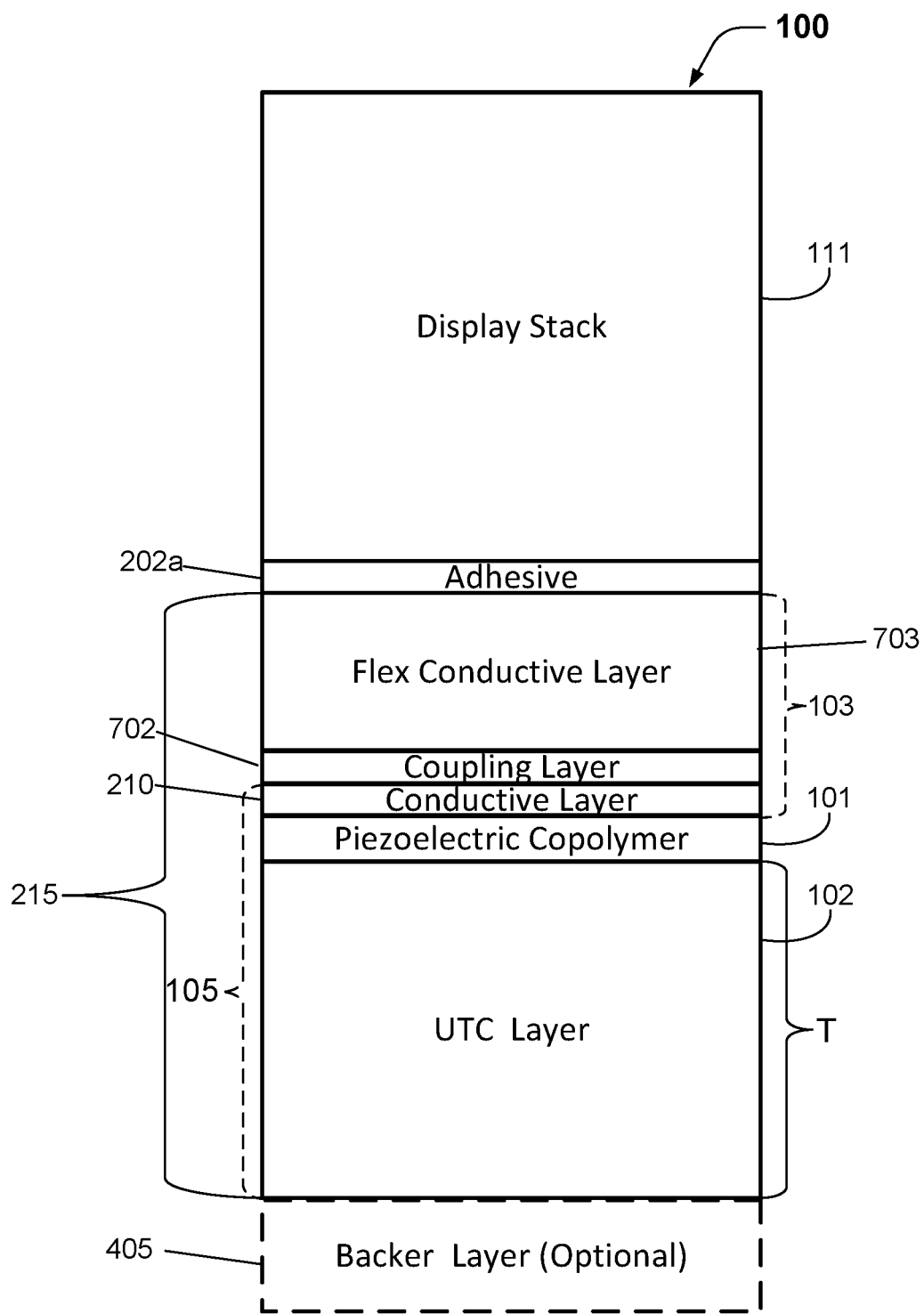
FIG. 7 is a cross-section that shows additional examples of layers that the apparatus of FIG. 1 may include.

FIG. 7 is a cross-section that shows additional examples of layers that the apparatus of FIG. 1 may include. The types, number and arrangement of elements shown in FIG. 7 are merely examples. Other examples may include different types, numbers and/or arrangements of elements. Moreover, the elements shown in FIG. 7 are not drawn to scale.

In the example shown in FIG. 7, the flex conductive layer 703 may be considered to be, or at least to be part of, the high-impedance stack 103. According to some examples, the conductive layer 210 may be, or may include, a conductive ink, such as silver ink, or a conductive paste. The flex conductive layer 703 may function as part of the upper boundary of the acoustic resonator 215. In some examples, the flex conductive layer 703 may be modified to have a higher impedance by increasing the copper percentage in the area of the acoustic resonator 215. Having a very thin coupling layer 702, preferably less than 3 microns in thickness, can help the flex conductive layer 703 to function as part of the high-impedance stack 103, which forms the upper boundary of the acoustic resonator 215. In such examples, the high-impedance stack 103 includes a first high-impedance layer residing adjacent to the ultrasonic transceiver layer—the first high-impedance layer being the conductive layer 210—and a second high-impedance layer (the flex conductive layer 703) residing between the first high-impedance layer and the display stack.

However, in this particular example, the second high-impedance layer is the flex conductive layer 703. The flex conductive layer 703 may, for example, be a conductive portion of a flexible or "flex" cable. The flex cable may, for example, be configured to connect the ultrasonic sensor stack 105 to at least a portion of the control system 106, such as a "chip on flex." In some examples, the coupling layer 702 may be an anisotropic conductive film (ACF) that is configured for electrical connectivity between the flex conductive layer 703 and an adjacent layer. In this example, the adjacent layer is the conductive layer 210.

Figure 8A:
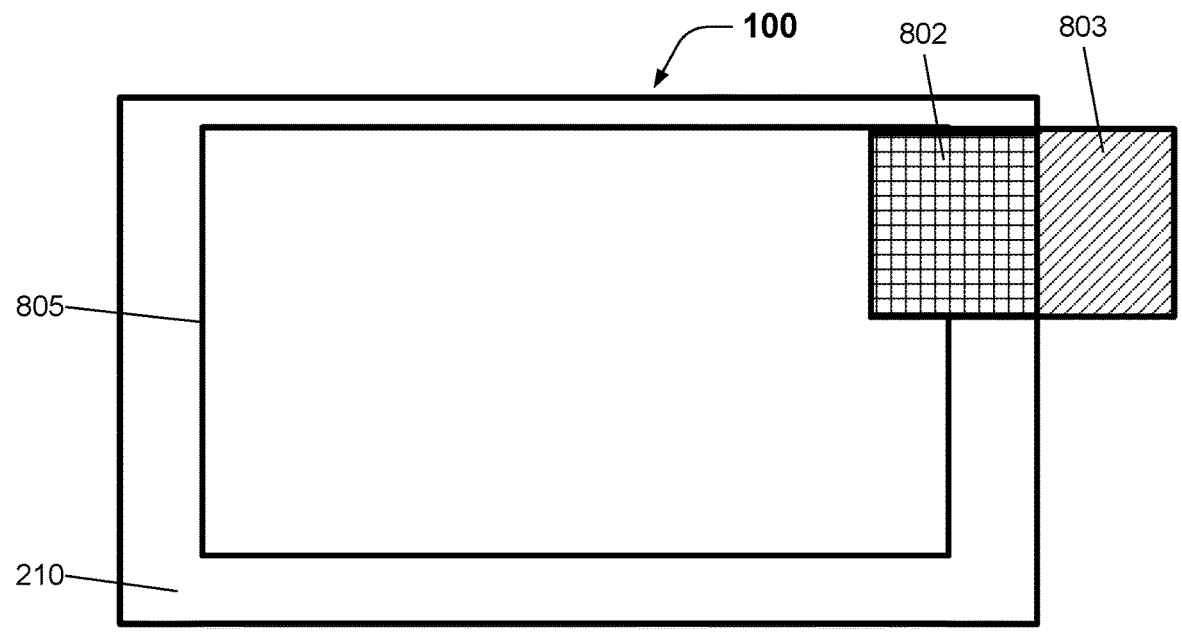
FIGS. 8A and 8B show top views of a flex cable connecting to two different implementations of a disclosed apparatus.
Figure 8B:
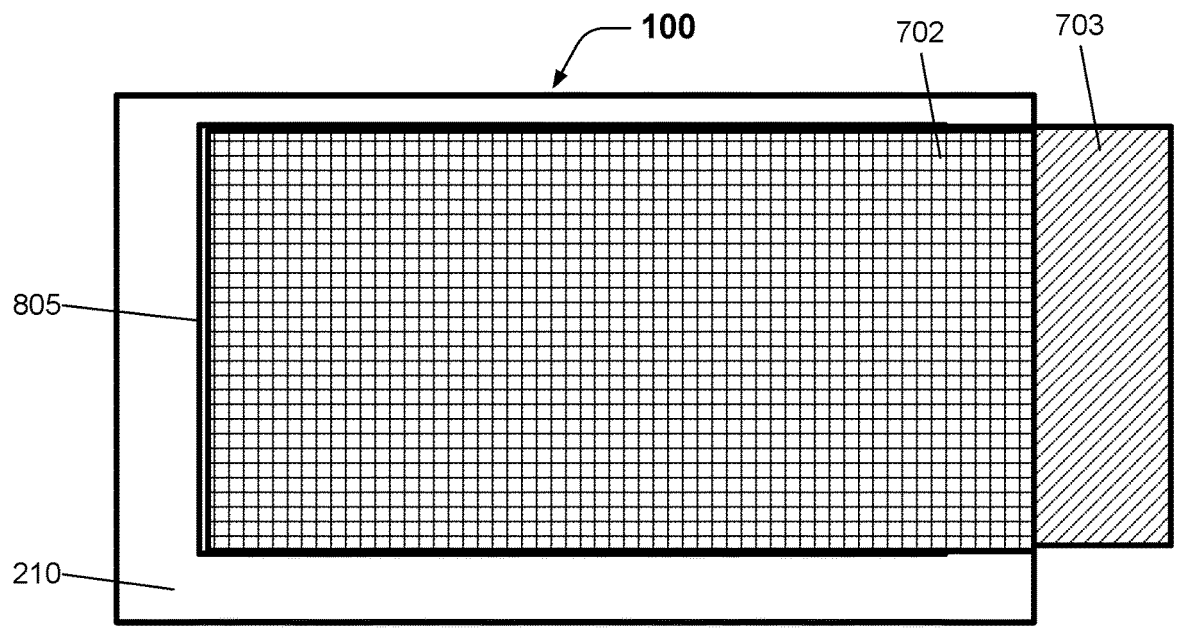

FIGS. 8A and 8B show top views of a flex cable connecting to two different implementations of a disclosed apparatus. The types, numbers and arrangements of elements shown in FIGS. 8A and 8B are merely examples. Other examples may include different types, numbers and/or arrangements of elements. Moreover, the elements shown in FIGS. 8A and 8B are not drawn to scale.

In FIGS. 8A and 8B, top views of the conductive layer 210 may be seen. In this context, the "top views" are views from the direction of where the display stack 111 would be, except that the display stack 111 is not shown in FIGS. 8A and 8B. The lower layers of the ultrasonic sensor stack 105 and the backer layer 405 (if present) are not shown in FIGS. 8A and 8B because they reside beneath the conductive layer 210. In FIGS. 8A and 8B, the area 805 corresponds to the active area of the ultrasonic sensor stack 105.

FIG. 8A shows a top view of a flex cable connecting to an implementation of the apparatus 100 such as that shown in FIG. 2A, 3 or 4. In this example, the flex conductive layer 803 is attached to the conductive layer 210 by a coupling layer 802, which may be an ACF layer. The coupling layer 802 is configured to electrically and physically connect the flex conductive layer 803 with the conductive layer 210.

FIG. 8B shows a top view of a flex cable connecting to an implementation of the apparatus 100 such as that shown in FIG. 7. In this example, the flex conductive layer 703 is attached to the conductive layer 210 by the coupling layer 702, which is configured to electrically and physically connect the flex conductive layer 803 with the conductive layer 210. In this example, the flex conductive layer 703 extends over the entire active area 805. In addition to providing electrical connectivity, the flex conductive layer 703 is part of the acoustic resonator 215 that is shown in FIG. 7. According to some examples, one or more vias or through-holes may be formed in the flex conductive layer 703 and filled with bonding material for greater structural integrity. In some such examples, the material used to form the coupling layer 702 may be distributed and embedded in the flex conductive layer through one or more such vias to make a connection through the flex conductive layer 703, from the coupling layer 702 to the adhesive layer 202a.

Figure 9:
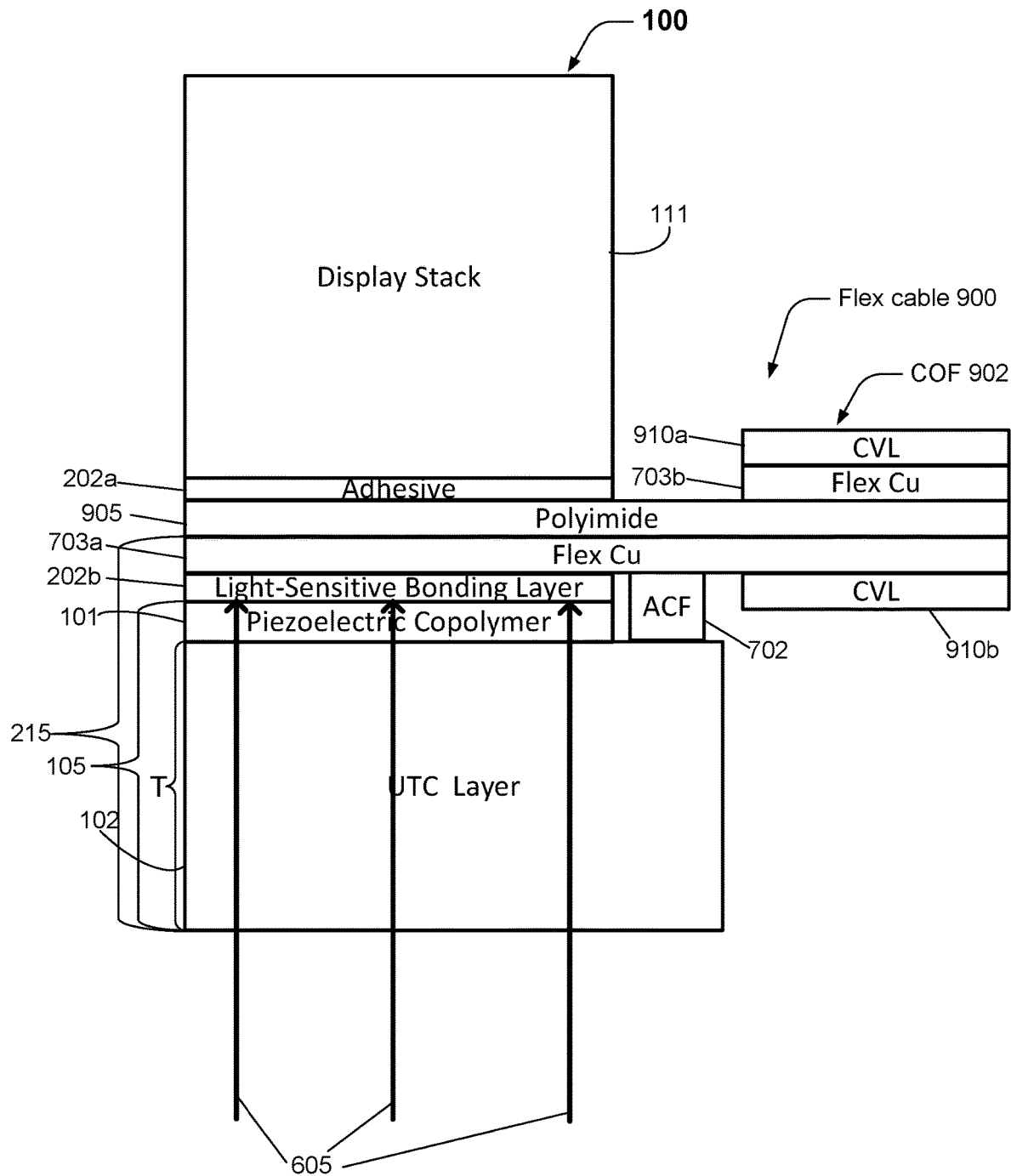
FIG. 9 is a cross-section that shows additional examples of layers that the apparatus of FIG. 1 may include.

FIG. 9 is a cross-section that shows additional examples of layers that the apparatus of FIG. 1 may include. The types, number and arrangement of elements shown in FIG. 9 are merely examples. Other examples may include different types, numbers and/or arrangements of elements. Moreover, the elements shown in FIG. 9 are not drawn to scale.

The implementation of the apparatus 100 that is shown FIG. 9 has similarities to the implementations shown in FIGS. 6 and 7. Like the implementation shown in FIG. 6, the apparatus 100 that is shown FIG. 9 includes a thin light-sensitive bonding layer 202b, which may be cured via irradiation with light 605. The light 605 may be, or may include ultraviolet light in some examples. In this example, as in the example shown in FIG. 6, the light 605 traverses the UTC layer 102, which may be a TFT layer in some instances, as well as the ultrasonic transceiver layer 101, which is a piezoelectric copolymer in this example. Like the implementation shown in FIG. 7, the apparatus 100 that is shown FIG. 9 includes a flex conductive layer, which forms one boundary of the acoustic resonator 215. In this example, the flex conductive layer is a flex copper layer 703a of the flex cable 900, which also includes an insulating layer 905, which is a polyimide layer in this example, a flex copper layer 703b and coverlay (CVL) layers 910a and 910b. CVL layers 910a and 910b are flexible insulating and protective layers.

However, there are various differences between the apparatus 100 of FIG. 9 and those of FIGS. 6 and 7. In this example, the apparatus 100 of FIG. 9 does not include the optional backer layer 405 that is shown in FIGS. 6 and 7. Moreover, unlike the example shown in FIG. 7, the acoustic resonator 215 shown in FIG. 9 does not include the coupling layer 702. Instead, the coupling layer 702 of FIG. 9—which is an ACF layer in this example—resides outside of the acoustic resonator 215 and connects the flex copper layer 703a to the UTC layer 102. The area occupied by the ACF layer may, in some examples, be much smaller than the sensor area. The ACF layer may be used to bond the flex copper layer 703a to the UTC layer 102 for electrical and physical connections.

Another difference between the apparatus 100 of FIG. 7 and that of FIG. 9 is that the apparatus 100 of FIG. 9 does not include a conductive layer 210 between the ultrasonic transceiver layer 101 and the flex conductive layer 703. However, in some alternative implementations of the apparatus 100 of FIG. 9, there may be a thin conductive layer 210—such as a conductive ink layer or a conductive paste layer—between the ultrasonic transceiver layer 101 and the light-sensitive bonding layer 202b. In some such examples, the conductive layer 210 may have a thickness of 5 microns or less.

FIG. 9 also shows layers of the chip-on-flex (COF) 902. In this example, the circuitry for the COF 902 resides in the flex copper layer 703b. Accordingly, the flex copper layer 703b may be regarded as being part of the control system 106 of FIG. 1.

Figure 10:
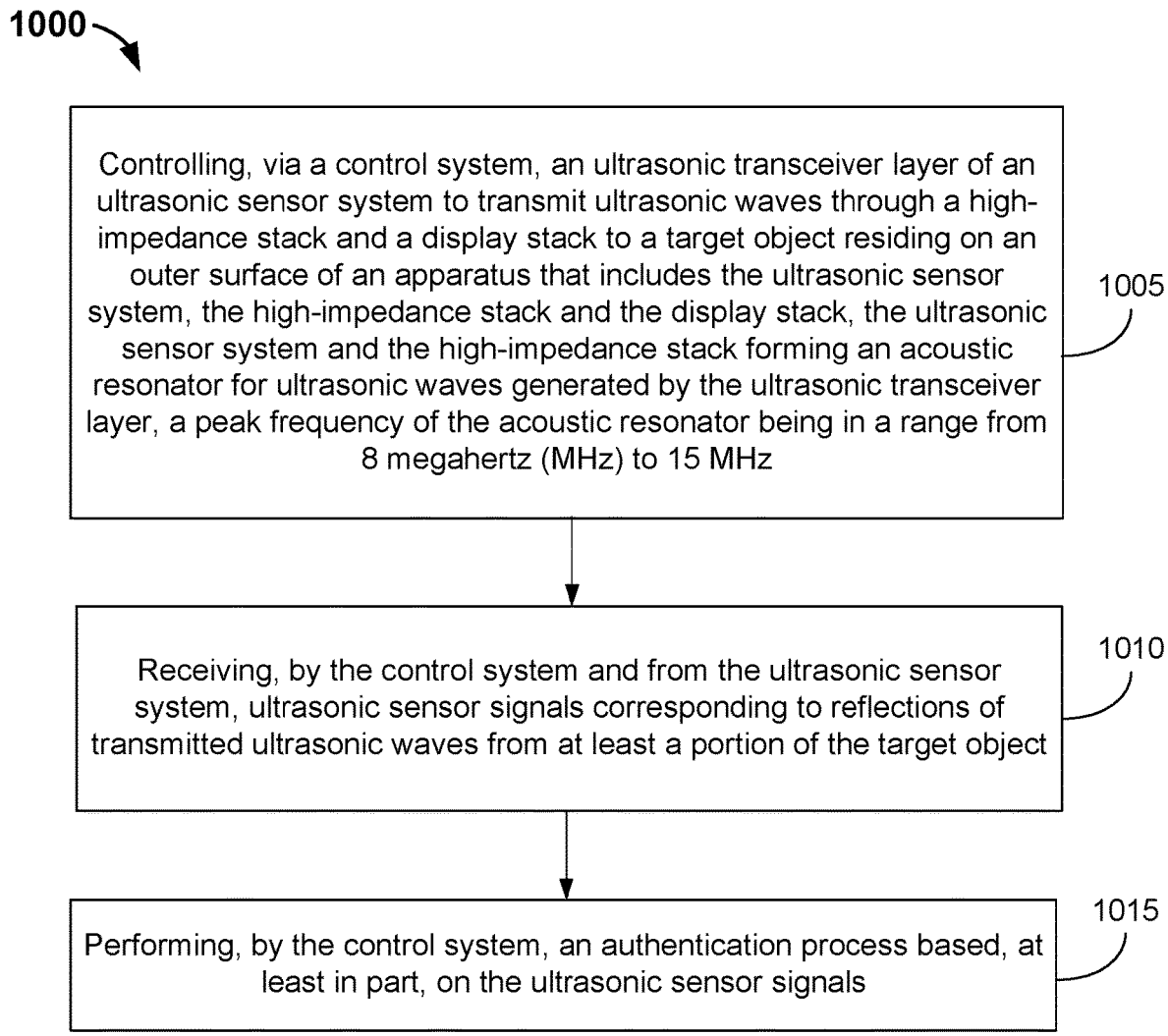
FIG. 10 is a flow diagram that provides examples of operations according to some disclosed methods.

FIG. 10 is a flow diagram that provides examples of operations according to some disclosed methods. The blocks of FIG. 10 may, for example, be performed by the apparatus 100 of FIG. 1 (e.g., by the control system 106 and the ultrasonic sensor stack 105), or by a similar apparatus. As with other methods disclosed herein, the method outlined in FIG. 10 may include more or fewer blocks than indicated. Moreover, the blocks of methods disclosed herein are not necessarily performed in the order indicated. In some instances, one or more blocks may be performed concurrently.

In this example, block 1005 involves controlling, via a control system (e.g., via the control system 106 of FIG. 1) an ultrasonic transceiver layer of an ultrasonic sensor system (e.g., the ultrasonic transceiver layer 101 of FIG. 1) to transmit ultrasonic waves through a high-impedance stack (e.g., the high-impedance stack 103 of any of FIG. 1, 2A or 3-7) and a display stack (e.g., the display stack 111 of any of FIG. 1, 2A or 3-7) to a target object residing on an outer surface of an apparatus that includes the ultrasonic sensor system, the high-impedance stack and the display stack (such as the target object 201 shown in FIG. 2A). In this example, the ultrasonic sensor system and the high-impedance stack form an acoustic resonator (such as the acoustic resonator 215 of any of FIG. 2A or 3-7) for ultrasonic waves generated by the ultrasonic transceiver layer. Here, a peak frequency of ultrasonic waves emitted by the acoustic resonator is in a range from 8 MHz to 15 MHz.

According to this implementation, block 1010 involves receiving, by the control system and from the ultrasonic sensor system, ultrasonic sensor signals corresponding to reflections of transmitted ultrasonic waves from at least a portion of the target object. According to some examples, the ultrasonic sensor signals may correspond to reflections from a surface of the portion of the target object, from an interior of the portion of the target object, or both. If the target object is a finger, the ultrasonic sensor signals may correspond to reflections of the second ultrasonic wave(s) from a surface of the finger, e.g., from ridges and valleys of a fingerprint, to reflections of the transmitted ultrasonic wave(s) from a subsurface of the finger, e.g., of reflections from one or more sub-epidermal features, or both.

According to this implementation, block 1015 involves performing, by the control system, an authentication process that is based, at least in part, on the ultrasonic sensor signals. In some implementations, method 1000 may involve controlling access to the apparatus, or to another device, based at least in part on the authentication process.

According to some implementations, block 1015 may involve obtaining fingerprint data based on portions of the ultrasonic sensor signals received within a time interval corresponding with fingerprints. The time interval may, for example, be measured relative to a time at which the ultrasonic waves were transmitted. Obtaining the fingerprint data may, for example, involve extracting target object features from the ultrasonic sensor signals. The target object features may, for example, comprise fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

In some examples, block 1015 may involve comparing the fingerprint features with fingerprint features of an authorized user. The fingerprint features of the authorized user may, for example, have been received during a previous enrollment process.

In some implementations, block 1015 may involve extracting sub-epidermal features from the ultrasonic sensor signals. Sub-epidermal features of the authorized user may, for example, have been received during a previous enrollment process. According to some implementations, the authentication process may involve comparing sub-epidermal features extracted from the ultrasonic sensor signals with sub-epidermal features of the authorized user.

In some such implementations, the sub-epidermal features may include sub-epidermal layer information corresponding to reflections of the ultrasonic waves received from the portion of the target object within a time interval corresponding with a sub-epidermal region. The sub-epidermal features may, for example, include dermis layer information corresponding to reflections of the second ultrasonic wave received from the portion of the target object. The dermis layer information may have been obtained within a time interval corresponding with a dermis layer. The authentication process may be based, at least in part, on the dermis layer information. Alternatively, or additionally, the sub-epidermal features may include information regarding other sub-epidermal layers, such as the papillary layer, the reticular layer, the subcutis, etc., any blood vessels, lymph vessels, sweat glands, hair follicles, hair papilla, fat lobules, etc., that may be present within such tissue layers, muscle tissue, bone material, etc.

Implementation examples are described in the following numbered clauses:

1. An apparatus, including: a display stack; an ultrasonic sensor stack including an ultrasonic transceiver layer and an ultrasonic transceiver circuitry layer; and a high-impedance stack including one or more high-impedance layers, the high-impedance stack residing between the ultrasonic sensor stack and the display stack, each of the one or more high-impedance layers having an acoustic impedance that is higher than an acoustic impedance of the ultrasonic transceiver circuitry layer, where: the high-impedance stack and the ultrasonic sensor stack form an acoustic resonator bounded by the ultrasonic transceiver circuitry layer and the high-impedance stack; and a peak frequency of the acoustic resonator is a frequency used by the ultrasonic sensor stack for obtaining fingerprint images.

2. The apparatus of clause 1, where an apparatus stack portion that includes the ultrasonic sensor stack has a thickness corresponding to a multiple of a quarter wavelength at the peak frequency.

3. The apparatus of clause 1 or clause 2, where each of the one or more high-impedance layers has an acoustic impedance that is in a range from 20 megarayls (MRayls) to 50 MRayls.

4. The apparatus of any one of clauses 1-3, where the peak frequency of the acoustic resonator is in a range from 8 megahertz (MHz) to 15 MHz.

5. The apparatus of any one of clauses 1-4, where the ultrasonic transceiver layer is adjacent to the ultrasonic transceiver circuitry layer.

6. The apparatus of any one of clauses 1-5, where the high-impedance stack includes a single high-impedance layer.

7. The apparatus of clause 6, where the single high-impedance layer is a conductive layer.

8. The apparatus of clause 7, where the single high-impedance layer resides adjacent to the ultrasonic transceiver layer.

9. The apparatus of clause 7, where the single high-impedance layer resides proximate the ultrasonic transceiver layer, further including a bonding layer residing between the single high-impedance layer and the ultrasonic transceiver layer and where the bonding layer includes a light-curable adhesive layer, a thin light-curable resin-based epoxy or a pressure sensitive adhesive (PSA).

10. The apparatus of clause 9, where the bonding layer includes a PSA layer less than 3 microns in thickness.

11. The apparatus of any one of clauses 1-10, where the high-impedance stack includes: a first high-impedance layer residing adjacent to the ultrasonic transceiver layer, the first high-impedance layer being a conductive layer; and a second high-impedance layer residing between the first high-impedance layer and the display stack.

12. The apparatus of clause 11, further including an adhesive layer between the first high-impedance layer and the second high-impedance layer, where the adhesive layer is less than 3 microns in thickness.

13. The apparatus of clause 11 or clause 12, where the second high-impedance layer is a conductive portion of a flex cable configured for electrical connectivity with the ultrasonic sensor stack.

14. The apparatus of clause 13, further including an anisotropic conductive film (ACF) layer residing between the second high-impedance layer and the ultrasonic sensor stack.

15. The apparatus of clause 14, further including a thin conductive ink layer residing between the ultrasonic transceiver layer and the ACF layer.

16. The apparatus of any one of clauses 1-15, where the display stack includes a glass layer.

17. The apparatus of clause 16, where the peak frequency matches a resonant frequency of the display stack.

18. The apparatus of any one of clauses 1-17, further including a stiffener layer proximate the display stack.

19. The apparatus of any one of clauses 1-18, where at least one of the one or more high-impedance layers has an acoustic impedance that is higher than an acoustic impedance of any layer in the display stack or the ultrasonic sensor stack.

20. The apparatus of clause 19, where the ultrasonic transceiver circuitry layer includes a thin-film transistor (TFT) layer, a silicon layer, a polyethylene terephthalate layer, a polyimide layer, or combinations thereof.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:
   a display stack;
   an ultrasonic sensor stack including an ultrasonic transceiver layer and an ultrasonic transceiver circuitry layer; and
   a high-impedance stack including one or more high-impedance layers, the high-impedance stack residing between the ultrasonic sensor stack and the display stack, each of the one or more high-impedance layers having an acoustic impedance that is higher than an acoustic impedance of the ultrasonic transceiver circuitry layer, wherein:
   the high-impedance stack includes:
      a first high-impedance layer residing adjacent to the ultrasonic transceiver layer, the first high-impedance layer being a conductive layer;
      a second high-impedance layer residing between the first high-impedance layer and the display stack; and
      an adhesive layer between the first high-impedance layer and the second high-impedance layer, wherein the adhesive layer is less than 3 microns in thickness;
   the high-impedance stack and the ultrasonic sensor stack form an acoustic resonator bounded by the ultrasonic transceiver circuitry layer and the high-impedance stack; and
   a peak frequency of the acoustic resonator is a frequency used by the ultrasonic sensor stack for obtaining fingerprint images.

2. The apparatus of claim 1, wherein an apparatus stack portion that includes the ultrasonic sensor stack has a thickness corresponding to a multiple of a quarter wavelength at the peak frequency.

3. The apparatus of claim 1, wherein each of the one or more high-impedance layers has an acoustic impedance that is in a range from 20 megarayls (MRayls) to 50 MRayls.

4. The apparatus of claim 1, wherein the peak frequency of the acoustic resonator is in a range from 8 megahertz (MHz) to 15 MHz.

5. The apparatus of claim 1, wherein the ultrasonic transceiver layer is adjacent to the ultrasonic transceiver circuitry layer.

6. The apparatus of claim 1, wherein the high-impedance stack includes a single high-impedance layer.

7. The apparatus of claim 6, wherein the single high-impedance layer is a conductive layer.

8. The apparatus of claim 7, wherein the single high-impedance layer resides adjacent to the ultrasonic transceiver layer.

9. The apparatus of claim 7, wherein the single high-impedance layer resides proximate the ultrasonic transceiver layer, further comprising a bonding layer residing between the single high-impedance layer and the ultrasonic transceiver layer and wherein the bonding layer comprises a light-curable adhesive layer, a thin light-curable resin-based epoxy or a pressure sensitive adhesive (PSA).

10. The apparatus of claim 9, wherein the bonding layer comprises a PSA layer less than 3 microns in thickness.

11. The apparatus of claim 1, wherein the second high-impedance layer is a conductive portion of a flex cable configured for electrical connectivity with the ultrasonic sensor stack.

12. The apparatus of claim 11, further comprising an anisotropic conductive film (ACF) layer residing between the second high-impedance layer and the ultrasonic sensor stack.

13. The apparatus of claim 12, further comprising a conductive ink layer residing between the ultrasonic transceiver layer and the ACF layer, the conductive ink layer having a thickness of 5 microns or less.

14. The apparatus of claim 1, wherein the display stack includes a glass layer.

15. The apparatus of claim 14, wherein the peak frequency matches a resonant frequency of the display stack.

16. The apparatus of claim 1, further comprising a stiffener layer proximate the display stack.

17. The apparatus of claim 1, wherein at least one of the one or more high-impedance layers has an acoustic impedance that is higher than an acoustic impedance of any layer in the display stack or the ultrasonic sensor stack.

18. The apparatus of claim 17, wherein the ultrasonic transceiver circuitry layer comprises a thin-film transistor (TFT) layer, a silicon layer, a polyethylene terephthalate layer, a polyimide layer, or combinations thereof.

19. An apparatus, comprising:
   a display stack;
   an ultrasonic sensor stack including an ultrasonic transceiver layer and an ultrasonic transceiver circuitry layer; and
   a high-impedance stack including one or more high-impedance layers, the high-impedance stack residing between the ultrasonic sensor stack and the display stack, each of the one or more high-impedance layers having an acoustic impedance that is higher than an acoustic impedance of the ultrasonic transceiver circuitry layer, wherein:
   the high-impedance stack includes:
      a first high-impedance layer residing adjacent to the ultrasonic transceiver layer, the first high-impedance layer being a conductive layer;
      a second high-impedance layer residing between the first high-impedance layer and the display stack, wherein the second high-impedance layer is a conductive portion of a flex cable configured for electrical connectivity with the ultrasonic sensor stack; and an anisotropic conductive film (ACF) residing between the first high-impedance layer and the second high-impedance layer;

the high-impedance stack and the ultrasonic sensor stack form an acoustic resonator bounded by the ultrasonic transceiver circuitry layer and the high-impedance stack; and a peak frequency of the acoustic resonator is a frequency used by the ultrasonic sensor stack for obtaining fingerprint images.

20. The apparatus of claim 19, further comprising a conductive ink layer residing between the ultrasonic transceiver layer and the ACF layer, the conductive ink layer having a thickness of 5 microns or less.

* * * * *